United States Patent
Stobbe et al.

(10) Patent No.: US 10,138,429 B2
(45) Date of Patent: *Nov. 27, 2018

(54) METHOD FOR STARTING UP A FISCHER TROPSCH PROCESS

(71) Applicant: SHELL OIL COMPANY, Houston, TX (US)

(72) Inventors: Erwin Roderick Stobbe, Amsterdam (NL); Gerrit Leendert Bezemer, Amsterdam (NL); Peter John Van Den Brink, Amsterdam (NL); Alexander Petrus Van Bavel, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,912

(22) Filed: Jun. 21, 2017

(65) Prior Publication Data

US 2017/0283709 A1 Oct. 5, 2017

Related U.S. Application Data

(62) Division of application No. 14/906,928, filed as application No. PCT/EP2014/065057 on Jul. 14, 2014, now Pat. No. 9,758,730.

(30) Foreign Application Priority Data

Jul. 24, 2013 (EP) .................................... 13177880

(51) Int. Cl.

| | | |
|---|---|---|
| *B01J 23/75* | (2006.01) | |
| *B01J 37/04* | (2006.01) | |
| *B01J 37/12* | (2006.01) | |
| *B01J 37/24* | (2006.01) | |
| *C10G 2/00* | (2006.01) | |
| *B01J 37/18* | (2006.01) | |
| *B01J 23/889* | (2006.01) | |
| *B01J 21/06* | (2006.01) | |
| *B01J 27/128* | (2006.01) | |
| *B01J 37/02* | (2006.01) | |
| *B01J 27/135* | (2006.01) | |

(52) U.S. Cl.
CPC ............ *C10G 2/332* (2013.01); *B01J 21/063* (2013.01); *B01J 23/8892* (2013.01); *B01J 23/8896* (2013.01); *B01J 27/128* (2013.01); *B01J 27/135* (2013.01); *B01J 37/0201* (2013.01); *B01J 37/18* (2013.01); *B01J 37/24* (2013.01); *C10G 2/341* (2013.01); *C10G 2300/4031* (2013.01)

(58) Field of Classification Search
CPC ...... B01J 21/063; B01J 23/75; B01J 23/8892; B01J 23/8896; B01J 27/128; B01J 27/135; B01J 37/0201; B01J 37/04; B01J 37/12; B01J 37/24; C10G 2/332
USPC .................. 502/229, 324, 326, 350; 518/715
See application file for complete search history.

(56) References Cited

U.S. PATENT DOCUMENTS

| | | | | |
|---|---|---|---|---|
| 2,768,961 | A * | 10/1956 | Weck ....................... | C07C 1/043 502/228 |
| 3,842,121 | A * | 10/1974 | Ichikawa et al. .... | B01J 31/1616 502/181 |
| 4,568,663 | A * | 2/1986 | Mauldin .................. | B01J 23/75 502/325 |
| 4,595,703 | A | 6/1986 | Payne et al. | |
| 4,738,948 | A | 4/1988 | Iglesia et al. | |
| 5,169,821 | A | 12/1992 | Soled et al. | |
| 6,124,367 | A * | 9/2000 | Plecha .................... | B01J 21/063 502/326 |
| 6,759,440 | B2 * | 7/2004 | Geerlings .............. | B01J 23/889 518/715 |
| 6,872,300 | B1 * | 3/2005 | Galperin .............. | B01J 23/6567 208/134 |
| 8,097,555 | B2 * | 1/2012 | Costa ................... | B01J 23/6527 502/242 |
| 9,737,882 | B2 * | 8/2017 | Van Bavel ............ | C07C 1/0435 |
| 9,758,730 | B2 * | 9/2017 | Stobbe ................... | C10G 2/332 |
| 2007/0123594 | A1 * | 5/2007 | Dogterom .............. | B01J 21/066 518/716 |
| 2013/0231511 | A1 | 9/2013 | Wu | |
| 2016/0175820 | A1 * | 6/2016 | Bezemer ................. | B01J 37/08 518/715 |

FOREIGN PATENT DOCUMENTS

| | | |
|---|---|---|
| WO | 8601500 A1 | 3/1986 |
| WO | 9700231 A1 | 1/1997 |
| WO | 2006048424 A1 | 5/2006 |
| WO | 2008071640 A2 | 6/2008 |

OTHER PUBLICATIONS

Atashi et al., "Kinetic Study of Fischer-Tropsch Process on Titania-supported Cobalt-manganese Catalyst", Journal of Industrial and Engineering Chemistry, 2010, vol. 16, pp. 952-961.

* cited by examiner

*Primary Examiner* — Patricia L. Hailey

(57) ABSTRACT

The invention relates to a method to start up a Fischer-Tropsch process. A catalyst with a latent activity is used. The catalyst comprises titania, cobalt, promoter, and chlorine. The catalyst comprises more than 0.7 and less than 4 weight percent of the element chlorine, calculated on the total weight of the catalyst.

9 Claims, No Drawings

METHOD FOR STARTING UP A FISCHER TROPSCH PROCESS

The present invention relates to a method for starting up a Fischer Tropsch process. The present invention especially relates to a method in which a catalyst with a relatively high activity in a fixed catalyst bed is used.

The catalyst is suitable for use in producing normally gaseous, normally liquid and optionally solid hydrocarbons from synthesis gas generally provided from a hydrocarbonaceous feed, for example a Fischer-Tropsch process. In the current specification such a catalyst is referred to as a Fischer-Tropsch catalyst.

The present invention further relates to the catalyst and the use thereof in Fischer-Tropsch processes.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds and water. The obtained paraffinic compounds range from methane to high molecular weight modules. The obtained high molecular weight modules can comprise up to 200 carbon atoms, or, under particular circumstances, even more carbon atoms.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer-Tropsch synthesis often comprise a carrier based support material and one or more metals from Group 8-10 of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

One of the limitations of a Fischer-Tropsch process is that the activity of the catalyst will, due to a number of factors, decreases over time. The activity of the catalyst is decreased as compared to its initial catalytic activity. The initial activity of the catalyst can be its activity when fresh prepared. A catalyst that shows a decreased activity after use in a Fischer-Tropsch process is sometimes referred to as deactivated catalyst, even though it usually still shows activity. Sometimes such a catalyst is referred to as a deteriorated catalyst. Sometimes it is possible to regenerate the catalyst. This may be performed, for example, with one or more oxidation and/or reduction steps.

After regeneration, catalysts often show an activity that is lower than the activity of fresh prepared catalysts. Especially after multiple regenerations, it often proofs hard to regain an activity level comparable to the activity of fresh prepared catalysts. In order to be able to use a catalyst for a long time, it thus may be desirable to start a Fischer-Tropsch process with a catalyst that has a relatively high activity.

It has now been found that the use of catalysts with a relatively high initial activity may have disadvantages. This may especially be the case when the catalyst is fixed after loading of the catalyst in the reactor. One example of a filed reactor tube with a fixed catalyst is a reactor tube filled with a packed bed of catalyst particles.

In a Fischer Tropsch process with a catalyst with a relatively high activity, the activity of the catalyst is normally especially high at the start of the process. And, due to the high activity of the catalyst, the relative humidity is high at the start of the Fischer Tropsch process. During Fischer-Tropsch synthesis the relative humidity in a reactor tube may increase to such a level that it accelerates the deactivation of the catalyst during use. Therefore, especially at the start of a Fischer Tropsch process with a relatively highly active catalyst, the deactivation of the catalyst takes place at a relatively high rate. Deactivation due to relative humidity proofed to be difficult to reverse. The high initial activity in such a case is thus quickly lost, whereas regeneration procedures have only a limited effect.

It is one object of the present invention to provide a method for an improved start up of a Fischer Tropsch process in which a catalyst is used that has a relatively high activity. Especially the start up of a Fischer Tropsch process is improved in which a catalyst is used that has a relatively high activity and which is fixed in the reactor.

It is another object of the present invention to provide a catalyst which performs well at start up.

According to one aspect of the present invention, there is provided a method to start up a Fischer-Tropsch process comprising the steps of:
(a) providing a reactor with a Fischer-Tropsch catalyst that comprises:
   titania
   at least 5 weight percent cobalt, preferably in the range of between 5 to 35 weight percent cobalt, more preferably in the range of between 10 to 35 weight percent cobalt, even more preferably in the range of between 15 to 30 weight percent cobalt, still more preferably in the range of between 15 to 25 weight percent cobalt, calculated on the total weight of the catalyst
   in the range of between to 0.1 to 15 weight percent promoter, preferably in the range of between 0.5 to 5 weight percent promoter calculated on the total weight of the catalyst, whereby the promoter preferably comprises manganese, rhenium, Group 8-10 noble metals, or mixtures thereof, more preferably manganese or rhenium, most preferably manganese;
   and more than 0.7 and less than 4, preferably more than 0.7 and less than 3.5 and more preferred 0.7 to less than 3, weight percent of the element chlorine, calculated on the total weight of the catalyst,
(b) providing syngas to the reactor,
(c) providing the following process conditions in the reactor:
   a temperature in the range from 125 to 350° C., a pressure in the range from 5 to 150 bar absolute, and a gaseous hourly space velocity in the range from 500 to 10000 Nl/l/h.

Preferably the catalyst is fixed in the reactor.
Preferably at least 25 weight % of the catalyst comprises particles having a particle size of at least 1 mm. Particles having a particle size of at least 1 mm are defined as particles having a longest internal straight length of at least 1 mm.

The cobalt and titania comprising Fischer-Tropsch catalyst particles that are used in the process of the invention preferably have not been subjected to a Fischer-Tropsch process before use in the process according to the invention.

A fixed bed comprising cobalt and titania comprising Fischer-Tropsch catalyst particles preferably is a fixed bed in a reactor tube, said reactor tube being suitable for Fischer-Tropsch reactions.

The fixed bed preferably may be subjected to hydrogen or a hydrogen containing gas after loading a reactor tube. The fixed bed may alternatively be formed by loading a reactor tube with activated, i.e. reduced, catalyst particles.

It was surprisingly found that the process and catalyst of the present invention had several advantages. It proofed to be possible to make use of a relatively highly active catalyst at the start of a Fischer Tropsch process, which catalyst comprises chlorine. The high activity proofed to be partially reversibly inhibited by the chlorine, which resulted in a normal activity and a normal deactivation rate of the catalyst at the start of the Fischer-Tropsch process.

Another advantage of the present invention is that the Fischer Tropsch process can be started at a normal conversion rate, and thus a normal deactivation due to the accompanying humidity, while the catalyst additionally has a latent, or dormant, activity. Upon losing a part of the chlorine during the Fischer-Tropsch process, the catalyst proofed to recover its latent activity.

The process of the present invention proofed to be particularly useful for the start up of a Fischer-Tropsch process in a reactor with a fixed bed of a relatively high activity.

Further, when the activity of the catalyst is decreased after a long use in a Fischer-Tropsch process, the catalyst can be regenerated.

The catalyst provided in step (a) can be prepared by means of adding chlorine during or after the production of a cobalt and titania comprising catalyst.

Chlorine Impregnation of a Cobalt and Titania Comprising Catalyst

One process for preparing a catalyst with more than 0.7 and less than 4 weight percent of the element chlorine, calculated on the total weight of the catalyst comprises the following steps:

(a) providing a Fischer-Tropsch catalyst comprising:
  titania
  at least 5 weight percent cobalt, preferably in the range of between 5 to 35 weight percent cobalt, more preferably in the range of between 10 to 35 weight percent cobalt, even more preferably in the range of between 15 to 30 weight percent cobalt, still more preferably in the range of between 15 to 25 weight percent cobalt, calculated on the total weight of the catalyst
  in the range of between to 0.1 to 15 weight percent promoter, preferably in the range of between 0.5 to 5 weight percent promoter calculated on the total weight of the catalyst, whereby the promoter preferably comprises manganese, rhenium, Group 8-10 noble metals, or mixtures thereof, more preferably manganese or rhenium, most preferably manganese;
(b) impregnating the catalyst with one or more solutions comprising chloride ions until the catalyst comprises more than 0.7 up to 10 weight percent of the element chlorine, calculated on the total weight of the catalyst;
(c) heating the impregnated catalyst at a temperature in the range of 100 to 500° C., preferably 100 to 400° C., more preferably 100 to 350° C., for at least 5 minutes up to 2 days, preferably for at least 15 minutes up to 1 day, more preferably for at least 15 minutes up to 5 hours.

Preferably the catalyst is impregnated in step (b) until the catalyst comprises more than 0.7 up to 6, preferably more than 0.7 up to 4, more preferably more than 0.7 up to 3, even more preferably more than 0.7 up to 2.5, weight percent of the element chlorine, calculated on the total weight of the catalyst.

The impregnation process for the preparation of the catalyst preferably is a process wherein the amount of chlorine applied in step (b) and the temperature and duration of the heating of step (c) are adjusted to effect the preparation of a catalyst comprising more than 0.7 and less than 4 weight percent of the element chlorine, calculated on the total weight of the catalyst.

A solution comprising chloride ions which is impregnated in step (b) preferably is a solution comprising a liquid, and one or more metal salts of chloride, hydrochloric acid (HCl), one or more organic chloride compounds, or a combination thereof.

Chlorine Addition During the Preparation of a Cobalt and Titania Comprising Catalyst Another process for preparing a catalyst with more than 0.7 and less than 4 weight percent of the element chlorine, calculated on the total weight of the catalyst comprises the following steps:

(a) contacting
  cobalt and/or a cobalt compound;
  one or more promoter(s), whereby the promoter preferably comprises manganese, rhenium, Group 8-10 noble metals, or mixtures thereof, more preferably manganese or rhenium, most preferably manganese;
  one or more metal salts of chloride, hydrochloric acid (HCl), one or more organic chloride compounds, or a combination thereof; and
  a liquid;
  optionally one or more co-catalyst(s) or precursor(s) therefor; with titania;
(b) drying and/or calcining the material obtained in step (a) at a temperature in the range of 70 to 600, preferably 70 to 500° C., more preferably 70 to 350° C., whereby the material obtained in step (b) comprises:
  at least 5 weight percent cobalt, preferably in the range of between 5 to 35 weight percent cobalt, more preferably in the range of between 10 to 35 weight percent cobalt, even more preferably in the range of between 15 to 30 weight percent cobalt, still more preferably in the range of between 15 to 25 weight percent cobalt, calculated on the total weight of the catalyst,
  in the range of between to 0.1 to 15 weight percent promoter, preferably in the range of between 0.5 to 5 weight percent promoter, calculated on the total weight of the catalyst,
  and more than 0.7 up to 6, preferably more than 0.7 up to 4, more preferably more than 0.7 up to 3, even more preferably more than 0.7 up to 2.5, weight percent of the element chlorine, calculated on the total weight of the catalyst.

The total amount of the element chlorine on the catalyst that is prepared according to this process can be adjusted with the amount of chlorine comprising compound(s) used in step (a), the temperature of the drying and/or calcination in step (b), and the duration of the drying and/or calcination in step (b).

Chloride Sources

As stated above, HCl may be used in the catalyst preparation processes above.

Suitable organic chloride compounds for the catalyst preparation processes above have the potential to release a chloride ion when in solution.

The organic chloride compounds that may be used preferably is/are acyl chlorides, such as propionic acid chloride; alkyl ammonium chlorides, such as tetra butyl ammonium chloride; or mixtures thereof.

The metal salt(s) of chloride preferably is/are a chloride of manganese, cobalt, vanadium, titanium, silver, gold, zinc, platinum, palladium, zirconium, ruthenium, rhenium, rhodium, chromium, nickel, iron, osmium, or iridium or mixtures thereof. More preferably the metal salt(s) of chloride is/are a chloride of manganese, cobalt, silver, gold or zinc or mixtures thereof. Even more preferably the metal salt(s) of chloride is/are a chloride of manganese or cobalt, or mixtures thereof.

The metal salt(s) of chloride more preferably is/are a chloride of manganese such as manganese chloride ($MnCl_2$) and manganese chloride tetrahydrate ($Mn(H_2O)_4Cl_2$); a chloride of cobalt such as cobalt chloride ($CoCl_2$), hydrated cobalt chloride ($Co(H_2O)_6Cl_2$) and hexamminecobalt chloride ($[Co(NH_3)_6]Cl_3$); a chloride of silver such as silver chloride (AgCl); or a chloride of gold such as auric chloride ($AuCl_3$), gold chloride (AuCl) and chloroauric acid ($HAuCl_4$); zinc chloride (ZnCl) or mixtures thereof, more preferably manganese chloride ($MnCl_2$) and/or cobalt chloride ($CoCl_2$).

Liquid

Any suitable liquid known in the art may be used in the above described processes for preparing a catalyst. For example: water, ammonia; alcohols, such as methanol, ethanol and propanol; ketones, such as acetone; aldehydes, such as propanol and aromatic solvents, such as toluene, and mixtures of the aforesaid liquids may be used. A most convenient and preferred liquid is water.

Chlorine Content

During the preparation processes for the catalysts as described above, chlorine may or may not be removed during a heating step of the process. This depends on the amount of chlorine applied, the heating temperature, and the duration of the heating. When keeping to the ranges provided above, it is simple for a person skilled in the art to arrive at a catalyst comprising the desired amount of chlorine.

Catalyst

The invention also relates to the catalyst used in the process. A catalyst is provided comprising:
titania
at least 5 weight percent cobalt, preferably in the range of between 5 to 35 weight percent cobalt, more preferably in the range of between 10 to 35 weight percent cobalt, even more preferably in the range of between 15 to 30 weight percent cobalt, still more preferably in the range of between 15 to 25 weight percent cobalt, calculated on the total weight of the catalyst
in the range of between to 0.1 to 15 weight percent promoter, preferably in the range of between 0.5 to 5 weight percent promoter calculated on the total weight of the catalyst, whereby the promoter preferably comprises manganese, rhenium, Group 8-10 noble metals, or mixtures thereof, more preferably manganese or rhenium, most preferably manganese;
and more than 0.7 and less than 4, preferably more than 0.7 and less than 3.5 and more preferred 0.7 to less than 3, weight percent of the element chlorine, calculated on the total weight of the catalyst.

This catalyst proofed to perform well at the start up of a Fischer-Tropsch process.

During its production the catalyst may have been spray dried, pelletized, (wheel) pressed, extruded, or been made by applying a catalyst material onto a metal support such as a metal wire or a metal flake. Preferably the catalyst is suitable for forming a fixed bed in a reactor. Hence, the catalyst preferably is not a spray dried catalyst or a powder catalyst.

In one embodiment of the process according to the invention, the prepared catalyst may be reduced with hydrogen or a hydrogen comprising gas. Reduction may be formed, for example, at a temperature in the range of between 200 and 350° C. for 5 minutes up to several days.

Fischer-Tropsch

The Fischer-Tropsch process is well known to those skilled in the art and involves synthesis of hydrocarbons from syngas, by contacting the syngas at reaction conditions with the Fischer-Tropsch catalyst.

The synthesis gas can be provided by any suitable means, process or arrangement. This includes partial oxidation and/or reforming of a hydrocarbonaceous feedstock as is known in the art. To adjust the $H_2$/CO ratio in the syngas, carbon dioxide and/or steam may be introduced into the partial oxidation process. The $H_2$/CO ratio of fresh syngas feed is suitably between 0.5 and 2.1. The actually used syngas ratio in the Fischer Tropsch reactor may depend on the syngas source, and whether or not a recycle is present.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 175 to 275° C., most preferably 200 to 260° C. Typical total pressures for the catalytic conversion process are in the range of from 5 to 150 bar absolute, more preferably from 5 to 80 bar absolute. In the catalytic conversion process mainly C5+ hydrocarbons are formed. The gaseous hourly space velocity may be in the range from 500 to 10000 Nl/l/h.

EXPERIMENTAL

Measurement Method; Activity

Catalytic activities can be measured, for example, in a model Fischer-Tropsch reactor. The catalytic activities measured may be expressed as space time yield (STY) or as an activity factor, whereby an activity factor of 1 corresponds to a space time yield (STY) of 100 g/l·hr at 200° C.

Sample Preparation

Fixed bed particles were prepared as follows. Mixtures were prepared containing titania powder, cobalt hydroxide, manganese hydroxide, water and several extrusion aids. The mixtures were kneaded. The mixtures were shaped using extrusion. The extrudates were dried and calcined. The obtained catalysts contained about 20 wt % cobalt and about 1 wt % of manganese.

A part of the catalyst particles was used as reference (Comparative Examples). As one or more of the ingredients used comprised chlorine or chlorine components, the Comparative Examples comprised a very small amount of chlorine. Several batches were prepared, with slightly different properties.

The comparative examples and the examples according to the invention were tested under different conditions. The experimental data can be compared per measurement set as presented below.

Examples A1-A3

A base catalyst was prepared. The fixed bed catalyst particles of the base catalyst comprised 20 wt % cobalt and 1.1 wt % manganese on titania.

A part of the fixed bed particles of the base catalyst was impregnated with an aqueous cobalt chloride solution (CoCl2). During the impregnation 3 wt % of the element chlorine was added, calculated on the total weight of the dry catalyst. After the impregnation the catalyst particles were dried in air at 70° C. for 4 hours. In a subsequent final drying step in air, parts of the chorine impregnated catalyst particles were subjected to different final drying temperatures. After the final drying the chlorine content was determined by microcoulometry.

The catalyst particles were reduced with hydrogen at 280° C. for 18 hours, followed by a reduction with hydrogen at 290° C. for 2 hours.

The performance of each of the different samples prepared was tested using the following conditions in a Fischer-Tropsch reactor: a H2/CO ratio of 1.11, 25% N2, 60 bar, and 215° C. The selectivity of each of the samples was determined at 30% CO conversion after 60-100 hours time on stream. The base catalyst was used for a comparative example. Example A1 is an example according to the present invention.

Examples B1-B3

A base catalyst was prepared. The fixed bed catalyst particles of the base catalyst comprised 20 wt % cobalt and 1.1 wt % manganese on titania.

A part of the fixed bed particles of the base catalyst was impregnated with an aqueous cobalt chloride solution (CoCl2). In order to reach a target chloride content of 6 wt %, impregnation was carried out in 2 consecutive steps with drying for 4 hours at 70° C. in air after both steps. In a subsequent final drying step in air, parts of the chorine impregnated catalyst particles were subjected to different final drying temperatures and drying times. After the final drying the chlorine content was determined by XRF. The performance of each of the different samples prepared was tested as described for the previous examples.

The test results of the examples are summarized in Table 1.

TABLE 1

| Sample | Cl added (wt %) | Final drying step (° C./hrs) | Cl content after drying (wt %) | Act. factor | Act. change 50-100 hrs | C5+ select. (%) | CO2 select. (%) |
| --- | --- | --- | --- | --- | --- | --- | --- |
| Base cat. | 0 | None | 0.07 | 1.42 | −6% | 88.9 | 2.4 |
| A1 | 3 | 140/1 | 2.15 | 0.73 | 1% | 93.1 | 0.6 |
| A2 | 3 | 300/1 | 0.53 | 1.45 | −3% | 90.2 | 1.2 |
| A3 | 3 | 450/1 | 0.13 | NA | NA | NA | NA |
| B1 | 6 | 140/1 | 3.3 | 0.57 | 16% | 94.9 | 0.4 |
| B2 | 6 | 140/4 | 2.9 | 0.67 | 21% | 94.7 | 0.4 |
| B3 | 6 | 550/2 | 0.07 | NA | NA | NA | NA |

From these experiments is clear that the addition of a small amount of chlorine results in a higher selectivity towards C5+ hydrocarbons.

It is further visible that the amount of chlorine can be adjusted by means of the drying temperature and/or drying time.

A relatively high amount of chlorine, 2.15 wt %, resulted in a relatively high selectivity towards C5+ hydrocarbons. The activity of this catalyst was relatively low, but the overall performance of this catalyst was fine due to the high selectivity towards C5+ hydrocarbons. Moreover, this reduced activity is highly advantageous at the start-up of a Fischer-Tropsch process.

Additionally, it is clear that the low activity of the catalyst with the high amount of chlorine started to recover during test run hours 50-100.

The invention claimed is:

1. A Fischer-Tropsch catalyst that comprises:
   titania
   between 5 to 35 weight percent cobalt, calculated on the total weight of the catalyst
   in the range of between to 0.1 to 15 weight percent promoter, whereby the promoter comprises manganese, rhenium, Group 8-10 noble metals, or mixtures thereof;
   and more than 0.7 and less than 4 weight percent of the element chlorine, calculated on the total weight of the catalyst.

2. A Fischer-Tropsch catalyst according to claim 1 comprising 0.7 to less than 3 weight percent of the element chlorine.

3. A Fischer-Tropsch catalyst according to claim 2 comprising in the range of between 15 to 25 weight percent cobalt calculated on the total weight of the catalyst.

4. A Fischer-Tropsch catalyst according to claim 3 comprising in the range of between 0.5 to 5 weight percent manganese as a promoter, calculated on the total weight of the catalyst.

5. A process for preparing a Fischer-Tropsch catalyst comprising the steps of:
   (a1) providing a Fischer-Tropsch catalyst comprising:
      titania
      at least 5 weight percent cobalt, calculated on the total weight of the catalyst
      in the range of between to 0.1 to 15 weight percent promoter selected from the group consisting of manganese, rhenium, Group 8-10 noble metals, or mixtures thereof;
   (a2) impregnating the catalyst obtained in step (a1) with one or more solutions comprising chloride ions until the catalyst comprises more than 0.7 up to 10 weight percent of the element chlorine, calculated on the total weight of the catalyst; and
   (b) drying and/or calcining the material obtained in step (a2) at a temperature in the range 70 to 350° C.

6. The process of claim 5, wherein the Fischer-Tropsch catalyst cobalt in a range of from 5 to 35 weight percent cobalt, calculated on the total weight of the catalyst.

7. The process of claim 5, wherein the Fischer-Tropsch catalyst comprises cobalt in a range of from 10 to 35 weight percent cobalt, calculated on the total weight of the catalyst.

8. The process of claim 5, wherein the Fischer-Tropsch catalyst comprises cobalt in a range of from 15 to 30 weight percent cobalt, calculated on the total weight of the catalyst.

9. The process of claim 5, wherein the Fischer-Tropsch catalyst comprises cobalt in a range of from 15 to 25 weight percent cobalt, calculated on the total weight of the catalyst.

\* \* \* \* \*